March 14, 1967   L. E. BODKIN   3,308,907

MOTOR

Filed July 15, 1965   3 Sheets-Sheet 1

INVENTOR.
Lawrence E. Bodkin
BY
George H. Baldwin
ATTORNEY

March 14, 1967   L. E. BODKIN   3,308,907
MOTOR
Filed July 15, 1965   3 Sheets-Sheet 2

INVENTOR.
*Lawrence E. Bodkin*
BY
*George H. Baldwin*
ATTORNEY

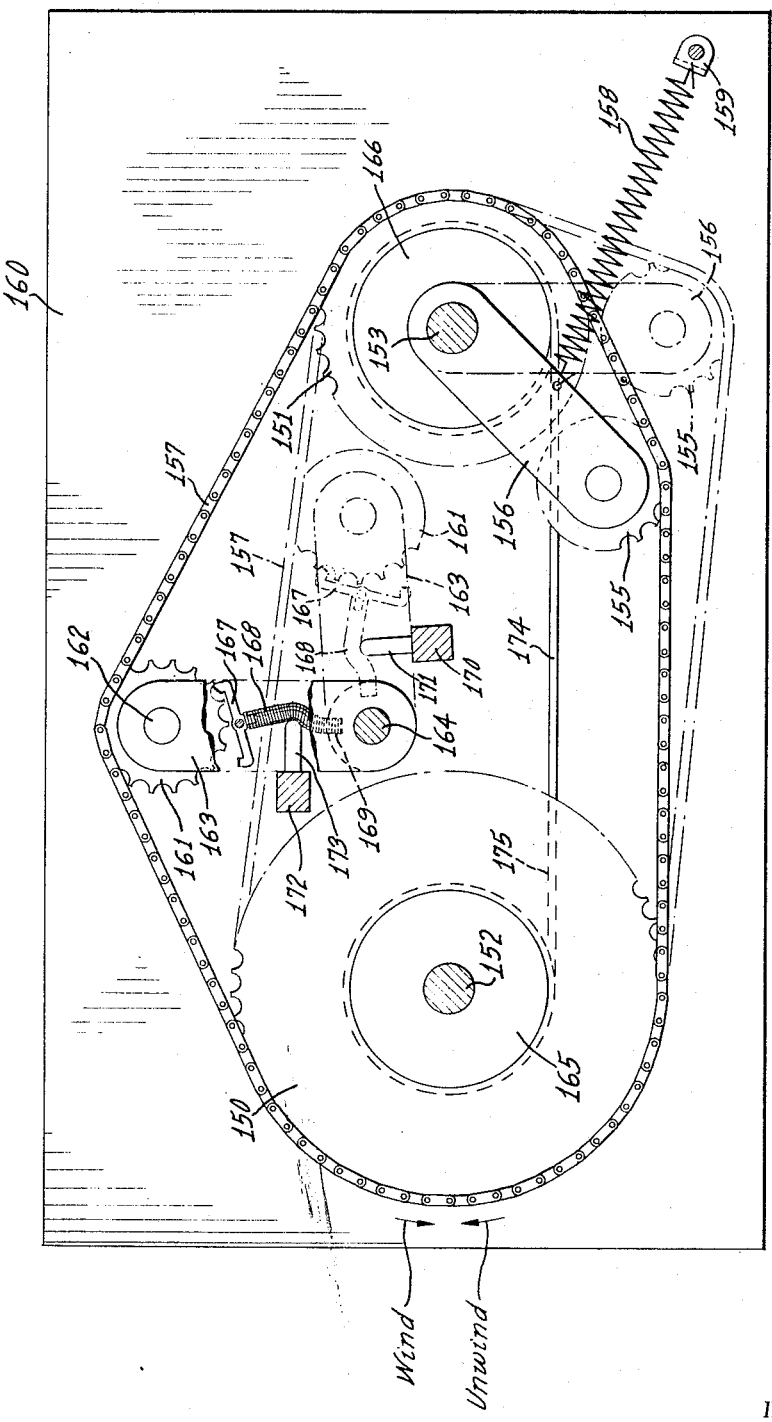

United States Patent Office 3,308,907
Patented Mar. 14, 1967

3,308,907
MOTOR
Lawrence E. Bodkin, 1833 Ryar Road,
Jacksonville, Fla. 32216
Filed July 15, 1965, Ser. No. 472,206
17 Claims. (Cl. 185—39)

This invention relates to motors and more particularly to a novel and improved motor powered by an elongated, longitudinally extensible and resilient member, such as a long strip of rubber.

The use of rubber bands and the like to provide power for various purposes is well known, but in such prior devices the rubber band is twisted by fixing one end of the band and rotating the other end about an axis extending between the ends of the band. While such motors are suitable for many purposes they do not provide constant torque and therefore do not operate at a uniform speed.

The use of an elongated resilient metal member, similar to a coilable steel rule, having a bendable convex-concave cross-section as the power member of a motor is also well known. While such motors may be constructed and arranged to provide substantially constant torque, the expense of manufacture and limitations in the nature of employable materials limit the practical applications and impose serious limiting factors upon the practicable maximum sizes.

It is the object of the present invention to provide a novel and improved motor which will provide uniform torque and speed output and which utilizes as its power source a longitudinally extensible and resilient member such as a simple rubber strip or elongated coil spring.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 7 is an end view of a fifth embodiment of a motor incorporating alternative compensation aspects of the invention.

Figure 1:
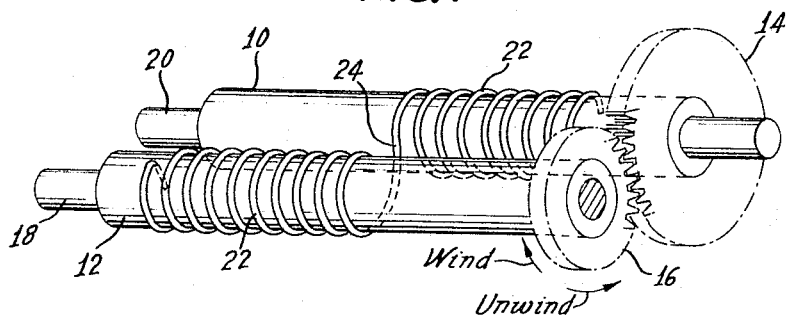
FIG. 1 is an isometric view of the basic elements of a motor constructed in accordance with this invention.
Figure 3:
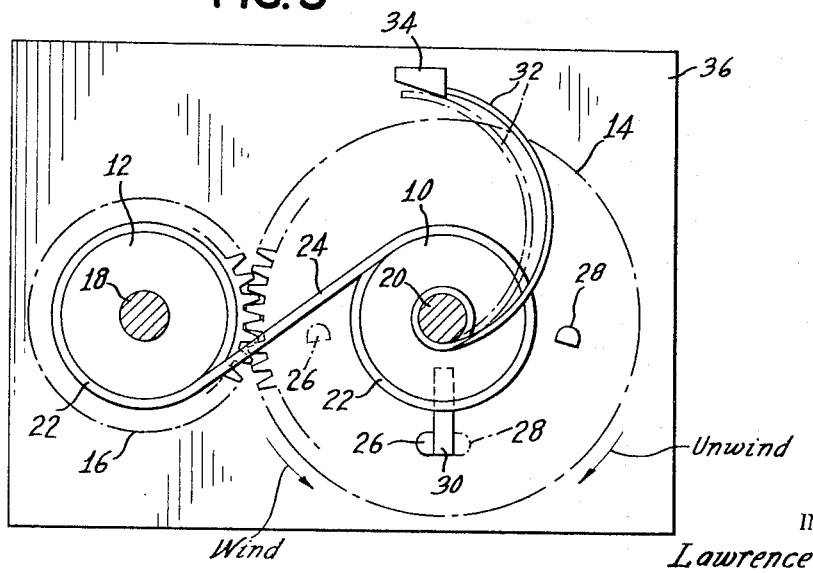
FIG. 3 is an enlarged end view of FIG. 1 incorporating compensation aspects of the invention.

With reference to the drawings, and particularly FIGS. 1 and 3, a motor constructed in accordance with this invention comprises a pair of rotatable members or spools 10 and 12. In the preferred embodiment, the rotational axes of the spools are parallel and the spools are spaced apart a short distance. In the embodiment of FIG. 1 the spools are of equal diameter and of constant diameter from end to end. A pair of intermeshed gears 14 and 16 are associated, respectively, with the spools 10 and 12. The gear 14 is of substantially larger diameter than the gear 16 whereby rotation of the gear 14 at one angular rate will effect rotation of the gear 16 at a substantially greater angular rate. The gear 16 is fixed to a shaft 18 that extends coaxially outwardly of the ends of the spool 12 and is fixed for rotation therewith. The shaft or axle 18 provides a means for rotatably supporting or journalling the spool 12 on a frame or the like (not shown). The spool 10 is mounted for rotation with a shaft or axle 20 extending coaxially from the ends of the spool and providing means for rotatably supporting or journalling the spool on a frame or the like (not shown). The gear 14 is fixed for rotation with the spool 10.

An elongated resilient member 22, such as a rubber strip or band, is wound about or on the spool 10. One end of the member 22 is anchored to the spool 10. The member 22 is wound on the spool 10 in a single layer with no portion of the member overlapping another portion thereof to achieve substantially constant output. In other words the turns of the member 22 are spaced apart on the spool 10. The member 22 is longitudinally extensible and resilient and preferably has a relatively high degree of elasticity. Where a coil spring is used for the member 22, it will be understood that the axis of the coil extends longitudinally of the member 22 and not axially of the spool. In other words, the coiled spring is wound on the spool. The member 22 is wound on the spool 10 with sufficient tension to assure that it will be frictionally retained in the desired position on the spool. However, it is preferred that only such tension as is necessary for this purpose be used. It is to be noted that where constant output is not required, the resilient member 22 may be overlapped to permit the use of a member of greater length thereby increasing the power capacity of the motor.

The other end of the power member 22 is anchored to the spool 12, whereby a portion 24 of the member 22 extends between the spools. The portion 24 extends from one spool to the other spool in a manner such that when the spools are rotated to wind the member on one spool and unwind it from the other spool, the spools will be rotated in directions corresponding to the direction of rotation of the respectively associated gears. In the embodiment of FIG. 1, it is intended to wind the member 22 on the spool 12 by rotating the spool 12 in a clockwise direction, as viewed from the right in FIG. 1. Accordingly, the portion 24 extends from the top of the spool 10 to the bottom of the spool 12. If it were desired to wind the member 22 on the spool 12 during rotation of the spool 12 in a counter-clockwise direction, the portion 24 would extend from the top of the spool 12 to the bottom of the spool 10. Further, if there were an odd number of idler or intermediate gears connecting the gears 10 and 12, rotation of the gear 16 in one direction would result in rotation of the gear 14 in the same direction. In such an arrangement, the portion 24 of the member 22 would extend between the tops or bottoms of the spools, depending on the direction of rotation of the spool 12 to wind the member 22 thereon. It will be apparent that the arrangement of the portion 24 of the member 22, as described in connection with the specific embodiment of FIG. 1, would be the same if there were an even number of idlers or intermediate gears connecting the gears 14 and 16.

Rotation of the shaft 18, and the attendant rotation of the spool 12 in a clockwise direction will, as mentioned above, result in the power member 22 being wound upon the spool 12 and unwound from the spool 10, it being assumed that the gear 14 is drivingly connected to the spool 10. As the gear 14 is of substantially greater diameter than the gear 16, and the spools are of equal diameter, the surface speed of the spool 12 will be substantially greater than that of the spool 10. Accordingly, the portion of the power member 22 wound upon the spool 12 will be under substantially greater tension than the portion of the member 22 disposed on the spool 10. The member 22 will be wound on the spool 12 in a single layer as it was on the spool 10. After winding the member 22 on the spool 12, as soon as the shaft 18 is released, and assuming the spool 10 is free to rotate, the stored energy in the portion of the member 22 on the spool 12 will effect a simultaneous rotation of the spools while at the same time causing the power member to be rewound on the spool 10. The direction of rotation of the spools at this time will be opposite the direction of rotation when the member 22 was wound from the spool 10 to the spool 12. The gear train drivingly connecting the spools will again determine the relative speed of rotation of the spools as well as assure that there will be simultaneous controlled rotation of the spools and rewinding of the power member on the supply spool 10. While the power output of the shafts 18 and 20 will be equal, inasmuch as the shafts will be driven at different speeds the torque output of the shafts will be different. If a lower speed, higher torque output is desired, the means to be driven by the motor should be connected to the shaft 20. On the other hand if a higher speed, lower torque output is desired, connection should be made to the shaft 18. Of course, if desired, separate devices could be connected to each of the shafts 18 and 20. It is contemplated that where it is desired to decouple the motor from the powered device during winding of the motor, a suitable clutch, for example a simple overriding clutch, may be used to connect the motor to the device to be driven thereby. Also, while the operation of the motor was described above as being continuous it is contemplated that means, such as an escapement may be operatively associated with one of the shafts 18 or 20 to provide controlled intermittent operation over a larger period of time. However, in any event the torque output of the shafts will be substantially constant over the entire range of operation, or in other words the torque output at the initiation of the rewinding of the power member will be the same as that at the conclusion. Also, where there is continuous operation of the motor the speed of rotation of the shafts 18 and 20 will be constant.

While a device of this invention, as thus far described, has obvious advantages over prior elastic member powered devices, where the device is repeatedly energized and run down there is a tendency for certain inaccuracies to accumulate which may require compensation for certain uses of the motor. More particularly, and with reference to FIG. 1, when the power member 22 is wound on the supply spool 10, the spanning portion 24 of the member 22 is in a substantially relaxed or untensioned condition. When the member 22 is initially wound upon the take up spool 12 there will be an increase in tension in the spanning portion 24 to a level equal to the tension in the portion of the member 22 wound on the take up spool. However, it will be apparent that at least a portion of the first turn of the power member on the take up spool will be under less tension than the remainder of the member 22 on the spool 12. This will result in a decrease in power and torque output at the very end of the rundown portion of the cycle.

Also, at the initiation of the run down portion of the cycle the entire spanning portion 24 will be under increased tension which will result in the initial portion of the power member rewound on the supply spool being under tension greater than at the beginning of the wind up portion of the cycle. In order to compensate for both of these conditions, means are provided to permit, during the initial portion of both the wind up and run down portions of the cycle, a predetermined rotation of the take up spool without any corresponding rotation of the supply spool. Thus, during initiation of the wind up portion of the cycle, the spanning or connective portion 24 of the power member 22 is guidely placed under the desired tension and at the initiation of the run down portion of the cycle the connective portion 24 is permitted to relax, or reduce in tension, before it is rewound on the supply spool.

In the specific embodiment of FIG. 3, the compensating means are in the form of a lost motion driving connection between the gear 14, which is rotatably mounted on, rather than being fixed on, the shaft 20, and the spool 10 mounted for movement with the shaft 20. More particularly, a pair of stops 26 and 28 are provided on the gear 14. The stops are spaced apart angularly about the axis of the gear and on opposite sides of a lug 30 fixed for movement with the spool 10. When the power member is wound on the supply spool 10, the lug 30 will be engaged with the stop 28 as shown in dotted lines in FIG. 3. Upon initial rotation of the spool 12 in a clockwise direction, as viewed in FIG. 3, the gear 14 will be rotated in a counter clockwise direction and relative to the spool 10 until the lug 30 is engaged by the stop 26, as shown in full lines in FIG. 3. During this time the spool 10 will tend to be rotated by the tension exerted on the connective portion 24. However, yieldable ratchet means are provided to prevent movement of the spool 10 until the gear 14 and spool 10 are drivingly connected. In the specific embodiment of FIG. 3, the yieldable ratchet means are provided by a coil spring 32 closely fitted over the shaft 20 and having one end extending arcuately outwardly of the shaft for engagement with a stop 34 on the frame 36 supporting the shafts 18 and 20. With the end of the spring 32 engaged with the stop 34, the friction between the spring and shaft 20 will prevent rotation of the shaft merely by the tension of the connective portion 24 of the power member 22. However, continued rotation of the gear 14 in a counterclockwise direction after engagement of the stop 26 and lug 30 will drive the spool 10 and thus the shaft 20 relative to the spring 32.

When the power member has been wound about the take up spool 12 and the spools are freed to permit initiation of the run down portion of the cycle, the tension in the connective portion 24 of the power member will initially effect rotation of the spool 12 and gear 16 in counter-clockwise direction, as viewed in FIG. 3, to drive the gear 14 in a clockwise direction. However, at the initiation of clockwise movement of the gear 14, the stop 28 is angularly spaced from the lug 30 as shown in full lines in FIG. 3. Therefore, until the gear 14 rotates sufficiently for stop 28 to engage lug 30, as shown by dotted lines 28 in FIG. 3, the spool 10 will not be rotated due to the drag on shaft 20 by spring 32. Accordingly, the connective element 24 will be substantially relaxed when the power member 22 begins to rewind on the supply spool 10. During the run down portion of the cycle the spring 32 will merely ratchet past the stop 34 as spool 10 and gear 14 rotate in the clockwise direction.

Thus, it can be seen that there has been provided a novel and improved elastic member powered motor. The power of the motor will be related to the modulus of elasticity of the power member 22 and the amount of tension in the member 22 when it is wound on the take-up spool. To obtain optimum efficiency the power member should be stressed as much as possible without imparting a permanent set to the material. While the invention has been described in terms of increasing the tension of the power member as it is wound on the take-up spool, it will be apparent that it is within the scope of the invention to impart a compressive stress to the power member in which case the supply spool would be the spool of greater angular velocity and the take-up spool the spool of lesser angular velocity. The lost motion compensation means in such a case would permit initial movement of the supply spool without corresponding movement of the take-up spool at the initiation of both the wind up and run down portions of the cycle.

Figure 2:
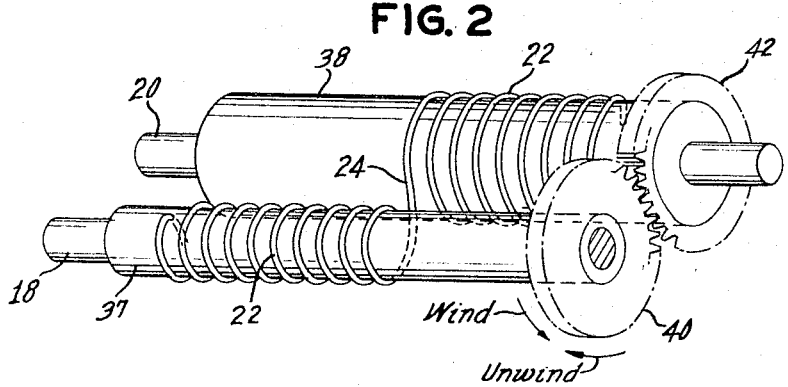
FIG. 2 is an isometric view of an alternative construction of the basic elements of a motor of this invention.

In the embodiments of FIGS. 1 and 3, the stress imparted to the power member 22 was effected by driving spools of the same diameter at different speed. The same result is achieved in the embodiment of FIG. 2, wherein the supply spool 37 and take-up spool 38 are of different diameter and the connecting gears 40 and 42 are of the same diameter. It is to be understood that the embodiment of FIG. 2 may also be provided with compensation means for the same purpose and in the same manner as described above in connection with the embodiment of FIGS. 1 and 3.

Figure 4:
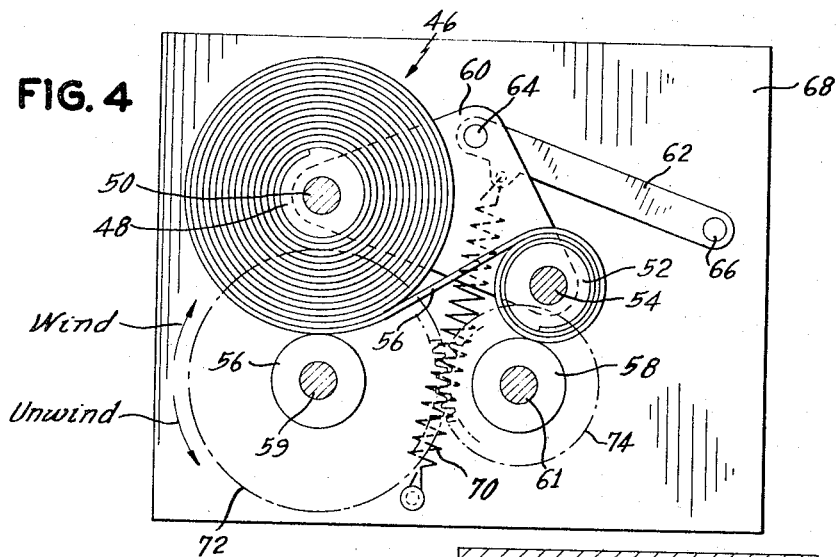
FIG. 4 is an end view of a second embodiment of a motor incorporating this invention.

With reference to the embodiment of FIG. 4, the elongated, flexible, longitudinally expansible and resilient power member 46 is spirally wound upon itself and about a hub or supply spool 48 journalled on a shaft 50. The inner end of the portion of the power member wound on the hub 48 is fixed to the hub. The other end of the power member is fixed to a cylindrical hub or take-up spool 52 disposed in coplanar relation to the hub 48 and mounted for rotation on a shaft 54 extending parallel to the shaft 50. The hubs 48 and 52 are spaced apart so that a connective portion 56 of the power member extends between the hubs. The hubs 48 and 52 are of the same diameter, although this is not essential. A pair of a rotatable, spaced apart friction wheels 56 and 58 are engaged with the outer surface of the outer layer of the power member on the hubs 48 and 52 respectively. The axes of the wheels 56 and 58 extend parallel to the axes of the hubs 48 and 52 and the wheels are of the same diameter. The hubs 48 and 52 are carried by shafts supported on a frame 60 which is movable generally toward and away from the wheels 56 and 58. A lever or link 62 is pivotally connected at one end of the frame 60 as at 64 at a point disposed midway between the shafts 50 and 54 of the hubs 48 and 52. The pivot 64 is preferably spaced laterally of a line extending between the axes of the shafts 50 and 54. The other end of the lever 62 is pivoted as at 66 on the main frame 68 supporting the shafts for the wheels 56 and 58. The axes of the pivots 66 and 64 extend parallel to the axes of the shafts 50 and 54.

A preloaded tension spring 70 is fixed at one end intermediate the ends of the lever 62 and at the other to the frame 68 whereby the springs urge the outer turns of the power member on the hubs 48 and 54 into frictional driving relationship with the wheels 56 and 58. A gear 72 is disposed coaxially of the wheel 56 and is fixed for movement therewith. The gear 72 is meshed with a gear 74 of smaller diameter which rotates with the wheel 58. As the wheel 56 is rotated in a clockwise direction as viewed in FIG. 4, the power member will be wound on the take-up hub 52 and unwound from the supply hub or spool 48. The driving engagement of the friction wheels with the power member and the gear ratio between the gears 72 and 74 drivingly connecting the friction wheels will assure that rotation of one of the hubs in one direction will effect rotation of the other hub in the opposite direction at relative angular velocities having the same ratio as the ratio of the gear train connecting the friction wheels. In other words, over the entire power cycle of the device, even though the effective diameters of the spiralled power member portions on the hubs 48 and 52 will vary over the power cycle of the motor, a constant tension will be imparted to the power member as it is wound on the take-up spool 52. Also, a constant torque output will be available at the gear shafts during run down or the power cycle of the motor. Thus, the embodiment of FIG. 4 functions in the same general manner and has the same advantages as the embodiment of FIG. 1 even though the power member is spirally wound rather than helically wound as in the embodiment of FIG. 1. Also, the various modifications possible with the embodiment of FIGS. 1 and 3 may also be made in the embodiment of FIG. 4.

It will also be understood that the embodiment of FIG. 4 may be provided with compensation means as described above in connection with the embodiment of FIG. 3. For example, lost motion means such as shown in FIG. 3 may be provided, for example, between the wheel 56 and gear 72 and yieldable ratchet means provided for the wheel 56 on shaft 59 to provide for movement of the gear 72 relative to the wheel 56 and while the wheel 56 is stationary during the initial portion of both the wind-up and run down portions or cycle of the motor.

Figure 5:
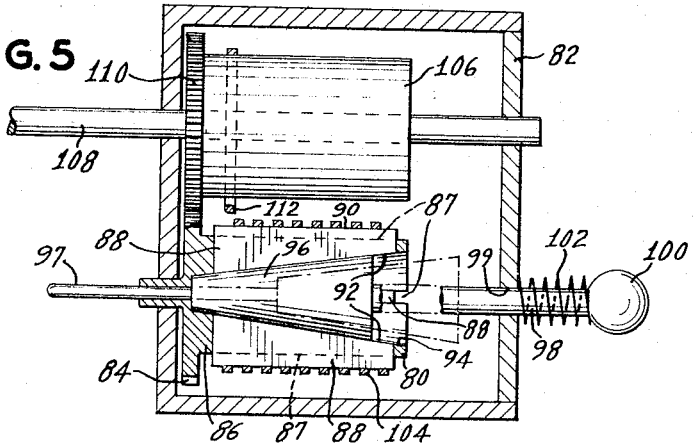
FIG. 5 is a cross-sectional view of a third embodiment of a motor incorporatinng this invention.

In the embodiment of FIG. 5, an elongated radially expandable, cylindrical supply spool 80 is rotatably supported on a frame 82. A gear 84 is formed integrally with, and is disposed coaxially of, one end of the generally cylindrical body 86 of the spool 80. The body 86 is provided with a plurality of slots 87 extending radially and longitudinally thereof and in which are respectively received a plurality of wedges 88. The wedges are spaced angularly about the axis of rotation of the spool 80 and there are preferably at least four of these wedges spaced equiangularly about the spool axis. Each of the wedges 88 has an outer edge 90 which extends parallel to the spool axis and an inner edge 92 which extends angularly of the spool axis. The edges 92 of the wedges are all inclined at the same angle to the spool axis and inwardly of the spool axis toward the end of the spool carrying the gear 84. The spool 80 is provided with a conical opening 94 extending from the end of the spool opposite the gear 84 toward gear 84. A frusto-conical oversized plug 96 is slidably received in the conical opening 94 in wedging engagement with the surfaces 92 on the wedges 88. A stem 97 extending coaxially from the lesser diameter end of the plug 96 is slidably received in a coaxially extension of the body 80 adjacent gear 84. A shaft 98 extends coaxially from the greater diameter end of the plug and through an opening 99 in the frame 82 terminating at its outer end in an enlarged head or handle 100 outwardly of frame 82. A compression coil spring 102 is arranged over the shaft 98 and acts between the head 100 and frame 82 to yieldingly urge the plug 96 out of the conical opening 94 in the spool 80 receiving the plug 96.

An elongated, flexible, and longitudinally extensible and resilient power member 104 is anchored at one end to the supply spool 80 and is wound in a single layer about or on the spool over the edges 90 of the wedges 88. The other end of the power member is anchored to an elongated cylindrical take up spool 106 extending parallel to the supply spool 80. The spool 106 is fixedly mounted on a shaft 108 rotatably suported on the frame 82. A gear 110 is fixed for rotation with the spool 106 and is drivingly engaged with the gear 84 on the spool 80. The gears 84 and 110 are preferably of the same diameter.

In the condition of the motor as shown in FIG. 5, the plug 96 has been pushed into the opening 94 in the supply spool 80 to force the wedges 88 radially outwardly a distance determined by the inclined angle and stroke of the tapered plug 96. The power member is initially wound on the spool 80 with the wedges 88 retracted their full amount due to partial withdrawal of the plug 96, so that when the plug is pushed into the spool 80 to extend the wedges, the tension in all of the turns of the power member will be simultaneously increased a substantial amount determined by the throw of the wedges. At the same time the tension in the connective portion 112 of the power member will be increased. The diameter of the take up spool 106 is, in accordance with one aspect of the invention, at least slightly greater than the effective diameter of the supply spool 80 when the wedges are fully retracted but is substantially less than the effective diameter of the supply spool 80 when the wedges are fully radially extended. Accordingly, when the wedges have been extended, the power member will unwind from the supply spool 80 (now converted into a take up spool) and wind upon the take up spool 106 (now converted into a supply spool) to provide a driving torque at the shaft 108 during a portion of the power cycle of the motor.

The included angle of the taper or the plug 96 is sufficiently small that the expanded power member on the supply spool 80 will not force the plug outwardly of the spool but rather will tend to maintain the plug in its inward portion. However, when the power member 104 has unwound, or almost entirely unwound, from the spool 80, the spring 102 which was compressed on insertion of the plug, will force the plug outwardly of the spool 80 to permit the wedges 88 to be retracted by the portion of the power member then remaining on the supply spool 80. Inasmuch as the diameter of the take up spool 106 is greater than the effective diameter of the spool 80 when the wedges are retracted, it will be apparent that the portion of the power member wound on the take up spool 106 will be under greater tension than the portion of the power member remaining on the spool 80 after retraction of the wedges. Thus, when the wedges retract, the power member will automatically unwind from the take up spool 106 back onto the supply spool 80 during the other portion of the power cycle of the motor, so that the motor is ready for another cycle without requiring rewinding of power member by the user. In this connection, the power member 104 is initially wound on the supply spool 80 under sufficient tension that, when the power member is on the take up spool 106, there will be sufficient power available to accomplish the rewinding operation. Inasmuch as the direction of rotation of the shaft 108 when the power member is winding onto the spool 106 will be opposite to that when the power member is unwinding from the spool 106, it may be desirable to provide an overriding clutch or another one way driving connection between the shaft and device to be powered.

Figure 6:
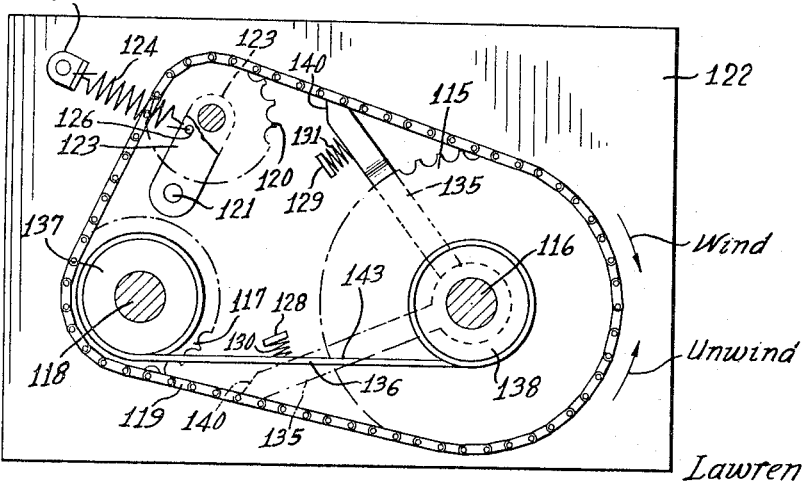
FIG. 6 is an end view of a fourth embodiment of a motor incorporating other compensation aspects of the invention.

In another specific embodiment of the invention depicted in FIG. 6, the compensating means are in another form of a lost motion device between sprocket or gear 115, which is mounted on shaft 116, and sprocket or gear 117, which is mounted on shaft 118, and an idler gear 120 is provided therebetween which is pivotally mounted at 121 to the frame 122 by a pair of arms 123. Idler gear 120 is yieldably retained counter-clockwise by spring 124 attached between the frame 122 by lug 125, and connection means 126 on arms 123 thereby retaining the chain 119 in a taut and unslackened manner. A pair of spaced stops 128 and 129 are provided on frame 122 angularly spaced with respect to gear 115, stops 128 and 129 having respective spring 130 and 131 adapted to be alternately engaged by ratchet lever 135 pivotally connected to frame 122 concentrically with respect to the shaft 116, spool 138 and sprocket 115. In the position shown, the elongated resilient member 136 is being released in the power cycle from take up spool 137 rotatably supported by shaft 118 and rewound on supply spool 138 rotatably mounted on shaft 116 whereby the chain 119 moves in the counterclockwise direction and the lever 135 is yieldingly retained in ratcheting engagement therewith by spring 131. When the chain 119 reverses in direction from a counterclockwise to a clockwise direction and the elongated resilient member 136 is being wound from supply spool 138 to take up spool 137 during the wind up cycle, the forward or outer free end portion 140 of lever 135 engages within one of the socket or openings (not shown) of chain 119 and the lever 135 pivots clockwise due to the force exerted on chain 119 from sprocket 115, and as lever 135 pivots clockwise the chain 119 travels clockwise a greater lineal distance than the lineal distance of the chain traveling from sprocket 115 toward sprocket 117 since idler 120 pivots inwardly and clockwise against the spring force permitting a length of chain 119 to be picked up by lever 135 as the chain 119 travels around sprockets 117 and 115. Upon approximately a one half rotation in the clockwise direction of sprocket 115 and lever 135, lever 135 slowly releases the picked up length of chain permitting spring 124 to contract, pivoting idler 120 in a counterclockwise direction thereby causing sprocket 117 to angularly advance or rotate farther and increase the tension in the initial spanning portion 143 of resilient member 136 similar to that which has been previously described in connection with FIG. 3. The tension of spring 124 must be at least greater than the average tension of the spanning portion 143 to effect proper compensation.

The tension on the initial spanning portions 143 is predetermined and herein, spool 137 advances about one half of a complete rotation thereby imparting increased tension to the initial turn of the spanning portion 143 on spool 137. The lever 135 is shown in broken lines in FIG. 6 which is the normal position thereof during the wind up cycle of the motor, i.e., the resilient member 136 being wound from supply spool 138 to take up spool 137. It is evident that lever 135 (as shown in broken lines) is yieldingly maintained in ratcheting relation with respect to chain 119 during the wind up cycle by compression spring 130.

When the resilient member 136 is completely wound on take up spool 137 and it is desired to release member 136 from take up spool 137 to supply spool 138 for the power cycle, it being understood that the spanning portion 143 of member 136 is in a tensioned condition, chain 119 begins to move counterclockwise around idler 120 due to the tension in the initial spanning portion 143 and end portion 140 of lever 135 engages within one of the sockets or openings (not shown) of chain 119 and begins to pivot in a counterclockwise direction, idler 120 pivots inwardly or clockwise to permit the chain 119 to be picked up by lever 135 as the chain 119 travels around sprockets 117 and 115, to permit the sprocket 117 to angularly rotate faster thereby permitting partial relaxation of the tension in the first spanning portion 143 of member 136 during the initial power cycle, similar to the compensation described with respect to FIG. 3. When sprocket 115 rotates about one half of the first counterclockwise rotation, the outer end portion 140 of lever 135 slowly releases the increased chain length, caused by lever 135 engaging chain 119 which pivoted idler 120 inwardly thereby permitting a greater lineal travel of chain 119, to permit idler 120 to pivot counterclockwise due to the force exerted thereon by tension spring 124 thereby maintaining chain 119 in a taut condition. The lever 135 assumes its ratcheting position shown in full lines in FIG. 6 with idler 120 pivoted to its position shown to maintain chain 119 taut during the remainder of the power cycle.

In the embodiment depicted in FIG. 7, compensation is accomplished by means of a lost motion means between sprocket 150, rotatably mounted on shaft 152, and sprocket 151, rotatably mounted on shaft 153. Shafts 152 and 153 are appropriately journalled on frame 160. An idler sprocket 155 is pivoted by means of arm 156 on shaft 153 to maintain a taut condition in chain 157 by means of tension spring 158 acting between lug 159 on frame 160 and arm 156 to urge arm 156 and its journalled idler sprocket 155 in a counterclockwise direction about shaft 153. Lost motion is achieved by means of a sprocket 161 rotatable on shaft 162 carried by arm 163 which is pivoted on shaft 164 fixed to frame 160. The full lines in FIG. 7 show compensation means in their position assumed during counterclockwise winding of elastic and extensible element 175 from supply spool 165 carried by sprocket 150 to take up spool 166 carried by sprocket 151. At the initial counterclockwise rotation, reversible ratchet pawl 167 causes sprocket 161 to resist rotation about shaft 162 thus pivoting sprocket 161 carried on arm 163 about shaft 164 counterclockwise from the position shown in dotted lines to the position shown in full lines thus creating a greater than normal angular advancement of sprocket 151 relative to sprocket 150 thus increasing tension in the initial spanning segment 174 of elastic element 175. Stop 172 fixed to frame 160 limits the counterclockwise travel of arm 163 while projection 173 of stop 172 contacts coil spring 168 acting between pawl 167 journalled in arm 163 and socket 169 in arm 163 and pushes it into its alternative position thus reversing the action of ratchet pawl 167 and permitting rotation of sprocket 161 in a counterclockwise direction during winding of element 175 from supply spool 165 to take up spool 166. Arm 163 is maintained in position during this operation by pressure exerted by chain 157 toward pivot shaft 164 produced by tension in spanning segment 174 of elastic element 175 and tensioning spring 158 acting on idler arm 156. When release is effected for the power cycle permitting tensioned elastic element 175 to be wound from take up spool 166 to supply spool 165 in a clockwise direction, ratchet pawl 167 prevents rotation of sprocket 161 in a clockwise direction thus causing such sprocket and arm 163 that carries it to be pulled from their positions shown in solid lines by chain 157, to resume their positions shown in dotted lines under pressure from chain 157 produced by tension of spanning portion 174 to element 175 and spring 158 acting on idler arm 156 and its sprocket 155 thus partially releasing tension in spanning segment 174. Stop 170 fixed to frame 160 limits the clockwise travel of arm 163 while projection 171 of stop 170 contacts spring 168 to force it into alternative position and thus reverse the action of ratchet pawl 167 and permit rotation of sprocket 161 in a clockwise direction during the power cycle of the device wherein element 175 is wound from take up spool 166 to supply spool 165.

While the invention has been described in terms of the specific embodiments shown, it will be apparent that there are many modifications which might be made without departing from the invention. For example, the lost motion connection in FIG. 3 might be located between the spool 12 and gear 16 in which case the yieldable ratchet would still be associated with the shaft 20 fixed to the spool 10; the spool 10 and 12 of FIG. 1 could be configured to have a varying diameter from end to end to vary the speed of operation and power output in a predetermined manner during operation of the motor; and the ratchet may be designed to operate in a plurality of positions of the supply spool by using a toothed ratchet wheel or a fine toothed gear in combination with a conventional spring loaded pawl. Lost motion connections other than those depicted and described in connection with FIGS. 3 and 6 might be employed in various modifications of the motors. As noted above, maximum efficiency will be obtained where the power member is tensioned, during the windup portion of the cycle, to a point just short of the yield or permanent set point of the material. In this connection where a power member has a very high modulus of elasticity, less elongation of the member is necessary to obtain relatively high power output.

As noted above, the motor of this invention may comprise rotatable support members for the power member which are either of the same diameter and rotated at different speeds or one of different diameters and rotated at the same speed. Also, the rotatable members might be of different diameter and rotated at different speeds, and as in the embodiment of FIG. 4, the power member may be wound on itself rather than in direct engagement with the rotatable support members or spools.

Thus, in the appended claims, it will be understood that where the power member is described as being wound or unwound "relative to" or "about" the rotatable support member at different "rates" it is intended to include within these terms the various equivalent relationships described hereinabove whereby the power member will be placed in a different condition of tension as it is moved from one support member to the other.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A motor comprising a pair of rotatable members, an elongated, longitudinally extensible and resilient member wound at least in part about one said rotatable member, one end of said resilient member being anchored on said one rotatable member, the other end of said resilient member being anchored on the other said rotatable member whereby one portion of said resilient member extends between said rotatable members, means forming a driving connection between said rotatable members to provide simultaneous rotation thereof to unwind said resilient member relative to said one member and wind said resilient member about said other rotatable member and to provide that said resilient member will be unwound relative to said one member at a rate different from the rate at which it will be wound about said other rotatable member, and means for providing that the ratio of the rates at which said resilient member is unwound relative to said one rotatable member and wound about said other rotatable member is substantially different during initial unwinding of said resilient member from said one member than during subsequent unwinding of said resilient member relative to said one member.

2. A motor comprising a pair of rotatable members, an elongated, longitudinally extensible and resilient member wound at least in part about one said rotatable member, one end of said resilient member being anchored on said one rotatable member, the other end of said resilient member being anchored on the other said rotatable member whereby one portion of said resilient member extends between said rotatable members, and means forming a driving connection between said rotatable members to provide simultaneous rotation thereof to unwind said resilient member relative to said one member and wind said resilient member about said other rotatable member and to provide that said resilient member will be unwound relative to said one member at a rate different from the rate at which it will be wound about said other rotatable member, and means for providing that the ratio of the rates at which said resilient member is unwound relative to said one member and wound about said other member will be substantially greater during initial unwinding of said resilient member relative to said one member than subsequent thereto to reduce the tension in said one portion of said resilient member.

3. A motor comprising a pair of rotatable members, an elongated, longitudinally extensible and resilient member wound at least in part about one said rotatable member, one end of said resilient member being anchored on said one rotatable member, the other end of said resilient member being anchored on the other said rotatable member whereby one portion of said resilient member extends between said rotatable members, and means forming a driving connection between said rotatable members to provide simultaneous rotation thereof to unwind said resilient member relative to said one member and wind said resilient member about said other rotatable member and to provide that said resilient member will be unwound relative to said one member at a rate different from the rate at which it will be wound about said other rotatable member, said means forming said driving connection including a lost motion means for providing lost motion between said one and other rotatable members.

4. A motor as described in claim 3 in which said means forming said driving connection includes a yieldable ratchet means acting on said one rotatable member.

5. A motor comprising a pair of parallel elongated spools, means mounting said spools for rotation about their longitudinal axes, an elongated longitudinally extensible and resilient power member wound upon a spool with one end of said power member anchored to said one spool, the other end of said power member being anchored to the other spool, whereby one portion of said power member extends between said spools, means including a gear train for drivingly connecting said spools, the ratio of diameters of said spools and the gear ratio of said gear train being of a predetermined relation to provide that said power member will be unwound from said one spool at a rate substantially less than the rate at which it will be wound on said other spool, and said means for drivingly connecting said spools including means for providing rotational movement of said other spool without corresponding rotational movement of said one spool during initial movement of said other spool both in the direction to wind said power member thereon and in the direction to unwind said power member therefrom.

6. A motor as described in claim 5 in which said spools are of equal diameter and the ratio of said gear train for said one spool to said other spool in less than one.

7. A motor as described in claim 5 in which said one spool has a diameter substantially less than the diameter of said other spool and said gear ratio is one.

8. A motor comprising a pair of coplanar support members, means mounting said support members for rotation about a pair of spaced parallel axes, an elongated longitudinally extensible and resilient power member anchored at one end to one of said support members and spirally wound upon itself over said one support member, the other end of said power member being anchored to the other support member whereby on simultaneous rotation of said support members said power member will be unwound from about said one support member and will be spirally wound upon itself and about said other support member, and means for drivingly connecting the outer turns of the portions of said power member on said support member for providing simultaneous rotation thereof and to provide for unwinding of said power member from about said one support member at a rate substantially less than the rate at which said power member is wound on said other power member.

9. A motor as described in claim 8 in which said means for providing simultaneous rotation of said support members includes means for providing rotational movement of said other support member without corresponding rotational movement of said one support member during initial movement of said other support member both in the direction to wind said power member about and to unwind said power member from about said other support member.

10. A motor as described in claim 8 in which said means to provide simultaneous rotation of said support member comprises a pair of coplanar rotatable members respectively drivingly engaged with the outer surface of the outer turns of said power member on said pair of support members, means mounting said rotatable members for rotation about axes parallel to the axes of said support members and means for moving said support members toward and away from said rotatable members, a gear train drivingly connecting said rotatable members and having a ratio of greater than one from said one rotatable member to said other rotatable member, and means urging said support members toward said rotatable members.

11. A motor comprising a pair of parallel spools, an elongated longitudinally extensible and resilient power member wound on one spool with one end anchored to said one spool and the other end thereof anchored on the other spool, said one spool being expansible between a first diameter less than the diameter of said other spool to a second diameter greater than the diameter of said second spool, means for expanding said one spool from said first to said second diameter, and means drivingly connecting said pair of spools.

12. A motor as described in claim 11 in which said one spool comprises a cylindrical member, a plurality of wedge members extending longitudinally of said cylindrical members, and spaced about the axis thereof, said cylindrical member having a plurality of slots receiving said wedge member, and a tapered plug extending into one end of said one spool in sliding engagement with said wedge members.

13. In a motor as described in claim 12, means urging said plug outwardly of said one end of said one spool.

14. A motor comprising a pair of rotatable members, an elongated, longitudinally extensible and resilient tension member wound at least in part about one said rotatable member, one end of said resilient member being anchored on said one rotatable member, the other end of said resilient member being anchored on the other said rotatable member whereby one portion of said resilient member extends between said rotatable members, and driving means forming a driving connection between said rotatable members for simultaneously rotating same to unwind said resilient member relative to said one member and wind said resilient member about said other member, said resilient member being unwound relative to said one rotatable member at a rate different from the rate at which it will be wound about said other rotatable member, said driving means including compensation means for permitting rotational movement of said other rotatable member during initial movement of said other rotatable member greater than the rotational movement of said one rotatable member while said resilient member is being initially unwound from said other rotatable member onto said one rotatable member thereby partially relaxing the tension of said resilient member.

15. A motor as described in claim 14 wherein said compensation means further permits rotational movement of said other rotatable member during initial movement of said other rotatable member greater than the rotational movement of said one rotatable member while said resilient member is being initially wound onto said other rotatable member from said one rotatable member thereby increasing the tension of said resilient member.

16. A motor comprising a pair of rotatable members, an elongated, longitudinally extensible and resilient tension member wound at least in part about one said rotatable member, one end of said resilient member being anchored on said one rotatable member, the other end of said resilient member being anchored on the other said rotatable member whereby one portion of said resilient member extends between said rotatable members, and driving means forming a driving connection between said rotatable members for simultaneously rotating same to unwind said resilient member relative to said one member and wind said resilient member about said other rotatable member, said driving means including a pair of sprockets and a chain therebetween, and lost motion means including a yieldable idler meshed with the chain for maintaining said chain taut cooperating with said one rotatable member to permit rotational movement of said other rotatable member without substantial rotational movement of said one rotatable member during initial movement of said other rotatable member in directions to wind said resilient tension member on and to unwind same from said other rotatable member.

17. A motor comprising a pair of rotatable members, an extensible and contractible power member engaged in part with each of said rotatable members whereby said power member extends between said rotatable members and whereby contractive force of said power member imparts rotational force to said rotatable members, a pair of driving elements drivingly connected between said rotatable members to provide simultaneous rotation thereof to unwind said power member relative to said one rotatable member and wind said power member relative to said other rotatable member, the ratio of said driving elements and the relative cross-sectional dimensions of said rotatable members being of a predetermined relation to provide that said power member will be unwound relative to said one rotatable member at a rate different from the rate at which it will be wound relative to said other rotatable member, and lost motion means operatively associated with at least one of said pair of driving elements for providing lost motion between said driving elements.

References Cited by the Examiner

UNITED STATES PATENTS

| 108,915 | 11/1870 | Lathrop | 185—39 |
| 2,835,344 | 5/1958 | Allen | 185—37 |
| 2,844,217 | 7/1958 | Klosner | 185—37 |
| 3,194,343 | 7/1965 | Sindlinger | 185—37 |

FOREIGN PATENTS

| 134,457 | 11/1919 | Great Britain. |

EDGAR W. GEOGHEGAN, *Primary Examiner.*